(12) United States Patent
Hafvenstein et al.

(10) Patent No.: US 10,393,261 B2
(45) Date of Patent: Aug. 27, 2019

(54) HIGH AMBIENT TEMPERATURE PROPULSION SPEED CONTROL OF A SELF-PROPELLED AGRICULTURAL PRODUCT APPLICATOR

(71) Applicants: CNH Industrial America LLC, New Holland, PA (US); Danfoss Power Solutions Inc., Ames, IA (US)

(72) Inventors: David J. Hafvenstein, Benson, MN (US); Simon L. Nielsen, Ames, IA (US)

(73) Assignees: CNH Industrial America LLC, New Holland, PA (US); Danfoss Power Solutions Inc., Ames, IA (US)

( * ) Notice: Subject to any disclaimer, the term of this patent is extended or adjusted under 35 U.S.C. 154(b) by 0 days.

(21) Appl. No.: 15/833,089

(22) Filed: Dec. 6, 2017

(65) Prior Publication Data

US 2019/0170247 A1    Jun. 6, 2019

(51) Int. Cl.
| | |
|---|---|
| *F16H 61/42* | (2010.01) |
| *F16H 39/02* | (2006.01) |
| *F16H 61/47* | (2010.01) |
| *A01C 23/00* | (2006.01) |
| *F16H 59/72* | (2006.01) |
| *A01M 21/04* | (2006.01) |

(52) U.S. Cl.
CPC ............ *F16H 61/42* (2013.01); *F16H 39/02* (2013.01); *F16H 61/47* (2013.01); *A01C 23/00* (2013.01); *A01M 21/04* (2013.01); *F16H 59/72* (2013.01)

(58) Field of Classification Search
CPC .......... F16H 61/42; F16H 61/47; F16H 39/02; F16H 59/72; A01C 23/00; A01M 21/04
USPC ............................................................ 701/50
See application file for complete search history.

(56) References Cited

U.S. PATENT DOCUMENTS

| | | | |
|---|---|---|---|
| 3,851,723 | A | 12/1974 | Pagdin |
| 5,070,832 | A | 12/1991 | Hapka et al. |
| 5,315,897 | A | 5/1994 | Abe et al. |
| (Continued) | | | |

FOREIGN PATENT DOCUMENTS

| | | |
|---|---|---|
| CN | 202799856 U | 3/2013 |
| JP | 57-110549 A2 | 7/1982 |

*Primary Examiner* — Tan Q Nguyen
(74) *Attorney, Agent, or Firm* — Rebecca L. Henkel; Rickard K. DeMille

(57) ABSTRACT

A system, apparatus and method are provided for limiting operating speed at high temperatures of a self-propelled, agricultural product applicator having a hydraulic drive system including a pump supplying pressurized hydraulic fluid to a variable-displacement hydraulic motor operatively connected for propelling the applicator. A temperature sensor detects a temperature of the pressurized hydraulic fluid in the hydraulic system. A propel controller is operatively connected between the temperature sensor and the propulsion motor and configured for limiting displacement of the propulsion motor according to one or more predetermined de-rated conditions resulting in reduced motor speed, in accordance with a predetermined schedule, when predetermined motor de-rating activation temperature limits of the hydraulic fluid are detected by the temperature sensor. The controller is further configured for providing a de-rated condition warning signal prior to limiting displacement of the propulsion motor.

20 Claims, 3 Drawing Sheets

(56) References Cited

U.S. PATENT DOCUMENTS

| | | |
|---|---|---|
| 6,942,595 B2 | 9/2005 | Hrazdera |
| 7,921,816 B2 | 4/2011 | Okuda et al. |
| 8,090,514 B2 | 1/2012 | Tarasinski et al. |
| 8,286,748 B2 | 10/2012 | Takahashi et al. |
| 8,424,298 B2 | 4/2013 | Ariga et al. |
| 8,459,394 B2 * | 6/2013 | Storer .................. E02F 3/6481 172/75 |
| 8,694,382 B2 | 4/2014 | Aznavorian et al. |
| 8,924,152 B2 | 12/2014 | Hunt et al. |
| 9,238,406 B2 | 1/2016 | Stares |
| 9,322,603 B2 * | 4/2016 | Hyodo .................... E02F 9/226 |
| 2006/0156916 A1 * | 7/2006 | Boisvert ................. F15B 7/008 91/499 |
| 2014/0026550 A1 * | 1/2014 | Brinkman ............... F15B 21/14 60/414 |
| 2014/0277995 A1 | 9/2014 | Slaton et al. |
| 2015/0369261 A1 * | 12/2015 | Ries ........................ F16H 61/42 60/327 |
| 2016/0053879 A1 * | 2/2016 | Carl ...................... F04B 49/121 475/83 |
| 2016/0167719 A1 | 6/2016 | Higashiguchi et al. |
| 2016/0222996 A1 * | 8/2016 | Couch .................. F15B 19/005 |

* cited by examiner

US 10,393,261 B2

HIGH AMBIENT TEMPERATURE PROPULSION SPEED CONTROL OF A SELF-PROPELLED AGRICULTURAL PRODUCT APPLICATOR

FIELD OF THE INVENTION

This invention generally relates self-propelled agricultural product applicators having hydrostatic propulsion systems, and more particularly to operation of such self-propelled applicators at high ambient temperatures.

BACKGROUND OF THE INVENTION

Modern agricultural practices rely heavily on precise and timely applications of fertilizers, herbicides, pesticides and other chemicals. In situations where the applications must be made to standing row crops, such as corn or beans, liquid or granular materials are often applied using a high ground clearance, self-propelled applicator.

In order to provide maximum ground clearance, such applicators utilize highly specialized suspension and propulsion systems for connecting the ground engaging wheels of the applicator to a frame of the applicator. Typically, separate hydraulic drive propulsion motors are provided as part of the suspension, for each drive wheel, to thereby further enhance ground clearance by minimizing the encroachment of typical drive train or suspension components into the space between the wheels under the applicator.

Sometimes it is necessary to operate these applicators under conditions of very high ambient temperatures, approaching the operational limit ratings of the applicator, in order to get the necessary chemicals applied within a narrow window of time when the chemicals will provide maximum benefit to the crops.

To improve operational effectiveness and efficiency, self-propelled agricultural product applicators have gotten larger and heavier, so that they can carry larger payloads of agricultural product, and cut down the time lost to refill the applicator. Modern applicators are typically also designed to operate at high speeds, up to 40 miles per hour, for example, while applying the agricultural product.

The combined effect of high ambient temperature, payloads and operating speeds can cause significant heating of the hydraulic fluid in the drive systems of modern self-propelled product applicators. Dealing with such heating of the hydraulic fluid in applicators that may operate need to operate continually for many hours under high ambient temperature conditions presents considerable challenges for designers of such applicators. Virtually all components of the hydrostatic drive system, and associated fluid coolers, fans, etc., must be considerably oversized, beyond requirements for normal temperature operation, in order maintain full rated operation of the applicator during occasional periods of unusually high ambient temperatures.

Such oversizing of the applicator and its components, solely to provide operation in rarely occurring ambient conditions is not desirable for a number of reasons. As the applicator itself becomes bigger and heavier, the payload of agricultural product that can be carried must typically be undesirably reduced. Bigger and heavier components required to deal with increased fluid heating at high ambient temperature also undesirably drives up manufacturing and operating costs, and the initial price of the applicator.

It is desirable, therefore, to provide an improved form of a self-propelled agricultural applicator, and improved systems and methods for operating such an applicator that allow for occasional operation at high ambient temperature conditions, without resorting to oversizing of many of the components that may be affected occasional operation of the applicator near the upper limits of rated operating temperatures.

BRIEF SUMMARY OF THE INVENTION

The invention provides a system, apparatus and method for limiting propulsion speed, at high temperatures, of a self-propelled, agricultural product applicator having a hydraulic drive system including a pump supplying pressurized hydraulic fluid to a variable-displacement hydraulic motor operatively connected for propelling the applicator. A temperature sensor detects a temperature of the pressurized hydraulic fluid in the hydraulic system. A propel controller is operatively connected between the temperature sensor and the propulsion motor. The controller is configured for limiting displacement of the propulsion motor according to one or more predetermined de-rated conditions resulting in reduced motor speed, in accordance with a predetermined schedule, when predetermined motor de-rating activation temperature limits of the hydraulic fluid are detected by the temperature sensor. The controller is further configured for providing a de-rated condition warning signal prior to limiting displacement of the propulsion motor.

By limiting operating speed in this manner, the applicator can continue to operate very near to its full rated speed at normal temperatures, even when fully loaded, during occasional high ambient temperature conditions, without causing hydraulic fluid temperatures to increase to levels that could reduce component life or otherwise compromise the hydraulic system. This is the case even when heavy product loads or non-optimum ground conditions require operation of the engine at full power.

As the load of product is dispensed, less power is required from the hydraulic system to propel the partly loaded applicator, and the temperature of the hydraulic fluid will begin to drop. The propel controller continues to monitor temperature of the hydraulic fluid, as reported by the temperature sensor, and restores the motors to full, non-de-rated operation when the temperature of the hydraulic fluid drops to acceptable levels. The need for oversizing components of the propulsion system and applicator is thus largely obviated. The engine and any ancillary equipment, such as a sprayer or other product application equipment may continue to operate at maximum power and efficiency, and the hydraulic propulsion system pump may continue to operate at maximum volume to circulate hydraulic fluid through heat exchangers to increase cooling of the hydraulic fluid.

In one form of the invention, a system is provided for limiting operating speed at high temperatures in a hydraulically-driven, self-propelled, agricultural product applicator having a hydraulic system including a pump supplying pressurized hydraulic fluid to a variable-displacement hydraulic drive motor operatively connected for propelling the applicator. The system includes a temperature sensor and a specially configured and connected propel controller. The temperature sensor is operatively connected for detecting a temperature of the pressurized hydraulic fluid at some location in the hydraulic system. The propel controller is operatively connected between the temperature sensor and the propulsion motor, and is configured for limiting displacement of the propulsion motor according to a predetermined de-rated condition resulting in reduced motor speed, when a predetermined motor de-rating activation temperature limit of the hydraulic fluid is detected by the temperature sensor.

In some forms of the invention, the propulsion motor may include a swashplate for controlling motor rotational speed as a function of swashplate angle, and the propel controller is operatively connected for limiting motor speed by limiting swashplate angle in the de-rated condition. The propulsion motor may be configured such that the propulsion motor operates at maximum speed when the swashplate angle and corresponding motor displacement are at minimum values, and the controller may be operatively connected to control the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition.

The invention may also utilize propulsion motors of other types, such as two-speed motors, or other types of variable displacement hydraulic motors.

The controller may also be configured to provide a warning signal prior to limiting displacement of the propulsion motor, when a predetermined warning activation temperature limit of the hydraulic fluid is detected by the temperature sensor, with the warning activation temperature being lower than the motor de-rating activation temperature. The propel controller may be further configured for maintaining the propulsion motor in the de-rated condition until the temperature sensor detects that the hydraulic fluid temperature has dropped to a predetermined motor de-rating de-activation temperature.

The controller may also be configured for de-rating the propulsion motor according to a derating schedule having at least a first and a second de-rated condition with corresponding first and second reductions in displacement of the propulsion motor in response to a schedule of respective first and second motor de-rating activation and de-activation temperatures.

In some forms of the invention the controller is configured for providing and maintaining a warning signal, and for reducing and maintaining propulsion motor displacement in accordance with a schedule of predetermined temperatures as determined by the temperature sensor, in which: (a) the controller sends the warning at a warning activation temperature, and maintains the warning until the temperature sensor detects that the hydraulic fluid has cooled to a warning de-activation temperature that is lower than the warning activation temperature; (b) the controller limits motor displacement to a first de-rated condition in a manner providing a first reduction in operating speed of the applicator at a first motor de-rating activation, temperature that is higher than the warning activation temperature, and maintains the motor displacement in the first de-rated condition until the temperature sensor detects that the hydraulic fluid has cooled to a first motor de-rating de-activation temperature that is lower than the first motor de-rating activation temperature; and, (c) the controller limits motor displacement to a second de-rated condition in a manner providing a second reduction in operating speed of the applicator at a second motor de-rating activation temperature that is higher than the first motor de-rating activation temperature, and maintains the motor displacement in the second de-rated condition until the temperature sensor detects that the hydraulic fluid has cooled to a second motor de-rating de-activation temperature that is lower than the second motor de-rating activation temperature.

The invention may also take the form of a self-propelled, hydraulically-driven, agricultural product applicator having an engine, a hydrostatic drive system, and a system for limiting operating speed of the agricultural product applicator at high temperatures in accordance with the invention. The hydrostatic drive system may include a propulsion pump driven by the engine at a fixed ratio of engine speed and supplying pressurized hydraulic fluid to a variable-displacement hydraulic drive motor operatively connected for propelling the applicator. The system for limiting operating speed of the agricultural product applicator at high temperatures, may include a temperature sensor operatively connected for detecting a temperature of the pressurized hydraulic fluid in the hydraulic system, and a propel controller. The propel controller may be operatively connected between the temperature sensor and the propulsion motor, and may be configured for limiting displacement of the propulsion motor according to a predetermined de-rated condition resulting in reduced motor speed, when a predetermined motor de-rating activation temperature limit of the hydraulic fluid is detected by the temperature sensor.

In some forms of an agricultural product applicator, according to the invention, the propulsion motor may include a swashplate for controlling motor rotational speed as a function of swashplate angle, and the propel controller may be operatively connected for limiting motor speed by limiting swashplate angle in the de-rated condition. The propulsion motor of the applicator may be configured to operate at maximum speed when the swashplate angle and corresponding motor displacement are at minimum values, and the controller of the applicator may be operatively connected to control the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition.

In some forms of an the applicator, according to the invention, the applicator may include at least one additional pump operatively connected to be driven from the propulsion pump at a fixed ratio of propulsion pump speed, for supplying a flow of pressurized hydraulic fluid to a non-propulsion hydraulic system of the applicator when the propel controller is operating the propulsion motor in a de-rated condition, and when the propel controller is operating the propulsion motor in a de-rated condition. In this manner, the engine and non-propulsion hydraulic system may continue to operate at maximum speed and power during periods of high ambient temperature when the propel controller is causing the propulsion motor to operate in a de-rated, speed-limited condition.

The propel controller, in an applicator according to the invention, may be further configured for de-rating the propulsion motor according to a derating schedule having at least a first and a second de-rated condition with corresponding first and second reductions in displacement of the propulsion motor in response to a schedule of respective first and second motor de-rating activation and de-activation temperatures.

In some forms of an agricultural product applicator, according to the invention, the propel controller may also be configured fir providing a warning signal prior to limiting displacement of the propulsion motor, when a predetermined warning activation temperature limit of the hydraulic fluid is detected by the temperature sensor, and for reducing and maintaining propulsion motor displacement in accordance with a schedule of predetermined temperatures as determined by the temperature sensor, in which: (a) the controller sends the warning at a warning activation temperature, and maintains the warning until the temperature sensor detects that the hydraulic fluid has cooled to a warning de-activation temperature that is lower than the warning activation temperature; (b) the controller limits motor displacement to a first de-rated condition in a manner providing a first reduction in operating speed of the applicator at a first motor de-rating activation temperature that is higher than the warning activation temperature, and maintains the limited motor displacement in the first de-rated condition until the temperature sensor detects that the hydraulic fluid has cooled to a first motor de-rating de-activation temperature that is lower than the first motor de-rating activation temperature; and, (c) the controller limits motor displacement to a second de-rated condition in a manner providing a second reduction in operating speed of the applicator at a second motor de-rating activation temperature that is higher than the first motor de-rating activation temperature, and maintains the limited motor displacement in the second de-rated condition until the temperature sensor detects that the hydraulic fluid has cooled to a second motor de-rating de-activation temperature that is lower than the second motor de-rating activation temperature.

The invention may also take the form of a method for limiting operating speed at high temperatures in a hydraulically-driven, self-propelled, agricultural product applicator having a hydraulic system including a propulsion pump supplying pressurized hydraulic fluid to a variable-displacement hydraulic propulsion motor operatively connected for propelling the applicator. Such a method may include: operatively connecting a temperature sensor for detecting a temperature of the pressurized hydraulic fluid in the hydraulic system; operatively connecting a propel controller between the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor; and limiting displacement of the propulsion motor according to the predetermined de-rated condition resulting in reduced propulsion motor speed, when a predetermined motor de-rating activation temperature limit of the hydraulic fluid is detected by the temperature sensor.

A method, according to the invention, may also include limiting operating speed at high temperatures in a hydraulically-driven, self-propelled, agricultural product applicator.

Where the propulsion motor includes a swashplate for controlling motor rotational speed as a function of swashplate angle, the propel controller is operatively connected for limiting propulsion motor speed by limiting swashplate angle in the de-rated condition, and the propulsion motor operates at maximum speed when the swashplate angle and corresponding motor displacement are at minimum values, and the controller is operatively connected to control the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition, a method, according to the invention may further include, controlling the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition.

In some forms of the invention, where the controller is configured for providing and maintaining a warning signal, and for reducing and maintaining propulsion motor displacement in accordance with a schedule of predetermined temperatures as determined by the temperature sensor, a method according to the invention may include performing at least one operation from the list of operations consisting of: (a) sending the warning signal at a warning activation temperature, and maintaining the warning until the temperature sensor detects that the hydraulic fluid has cooled to a warning de-activation temperature that is lower than the warning activation temperature; (b) limiting motor displacement to a first de-rated condition in a manner providing a first reduction in operating speed of the applicator at a first motor de-rating activation temperature that is higher than the warning activation temperature, and maintaining the limited motor displacement in the first de-rated condition until the temperature sensor detects that the hydraulic fluid has cooled to a first motor de-rating de-activation temperature that is lower than the first motor de-rating activation temperature; and (c) limiting motor displacement to a second de-rated condition in a manner providing a second reduction in operating speed of the applicator at a second motor de-rating activation temperature that is higher than the first motor de-rating activation temperature, and maintaining the limited motor displacement in the second de-rated condition until the temperature sensor detects that the hydraulic fluid has cooled to a second motor de-rating de-activation temperature that is lower than the second motor de-rating activation temperature.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
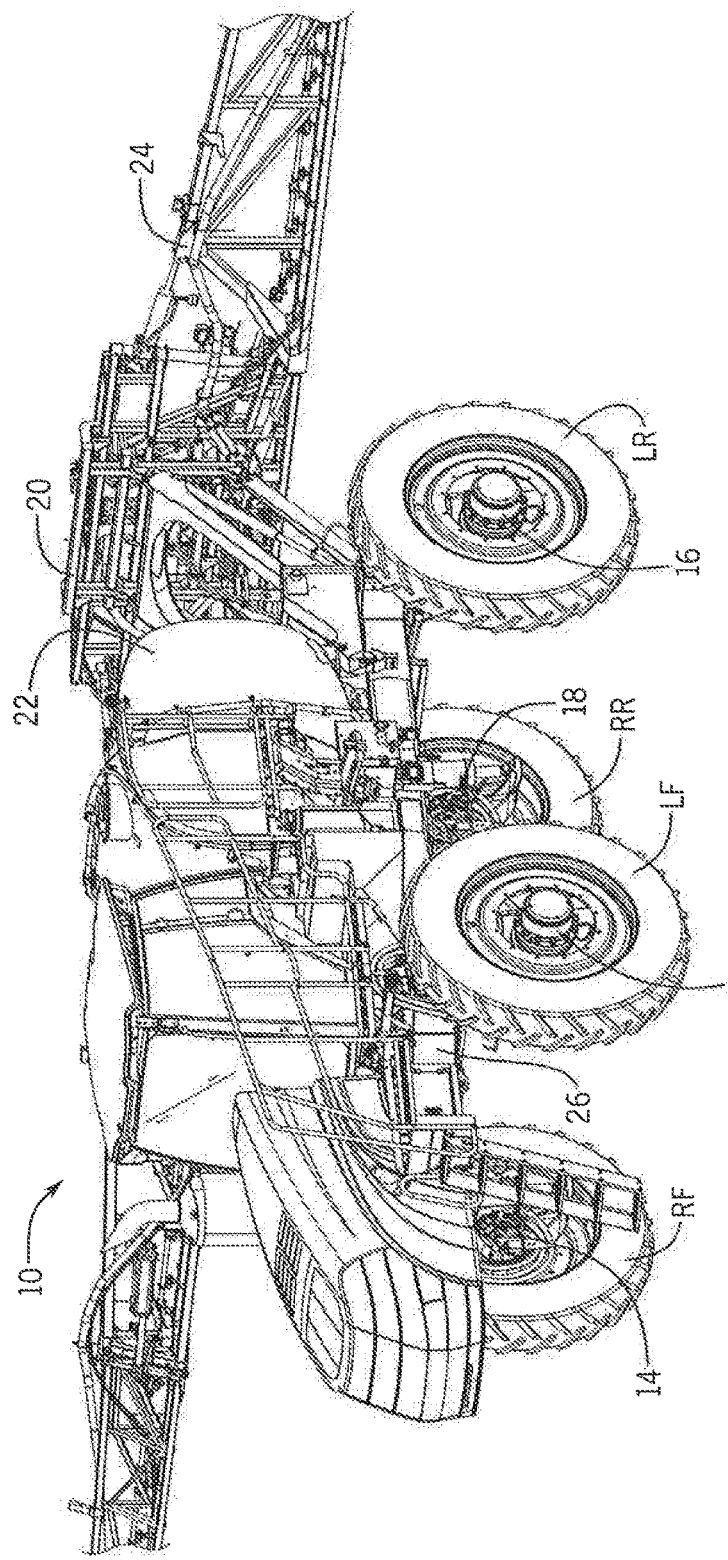
FIG. 1 is an isometric illustration of an exemplary embodiment of a self-propelled agricultural product applicator, according to the invention, incorporating a system for limiting propulsion speed of the applicator when operating at high ambient temperatures, by limiting displacement of four variable displacement hydraulic propulsion motors that independently drive four ground engaging wheels of the applicator.

FIG. 1 shows an exemplary embodiment of a self-propelled agricultural product applicator 10, incorporating a system for limiting propulsion speed of the applicator 10, when operating at high ambient temperatures, by limiting displacement of four variable displacement hydraulic propulsion motors 12,14,16,18 that are operatively connected to independently drive the hubs of four ground engaging wheels LF,RF,LR,RR of the applicator 10. The exemplary embodiment of the applicator 10 is shown carrying a sprayer 20, having a tank 22 for carrying a liquid agricultural product, and a spray nozzle distribution arrangement 24.

Figure 2:
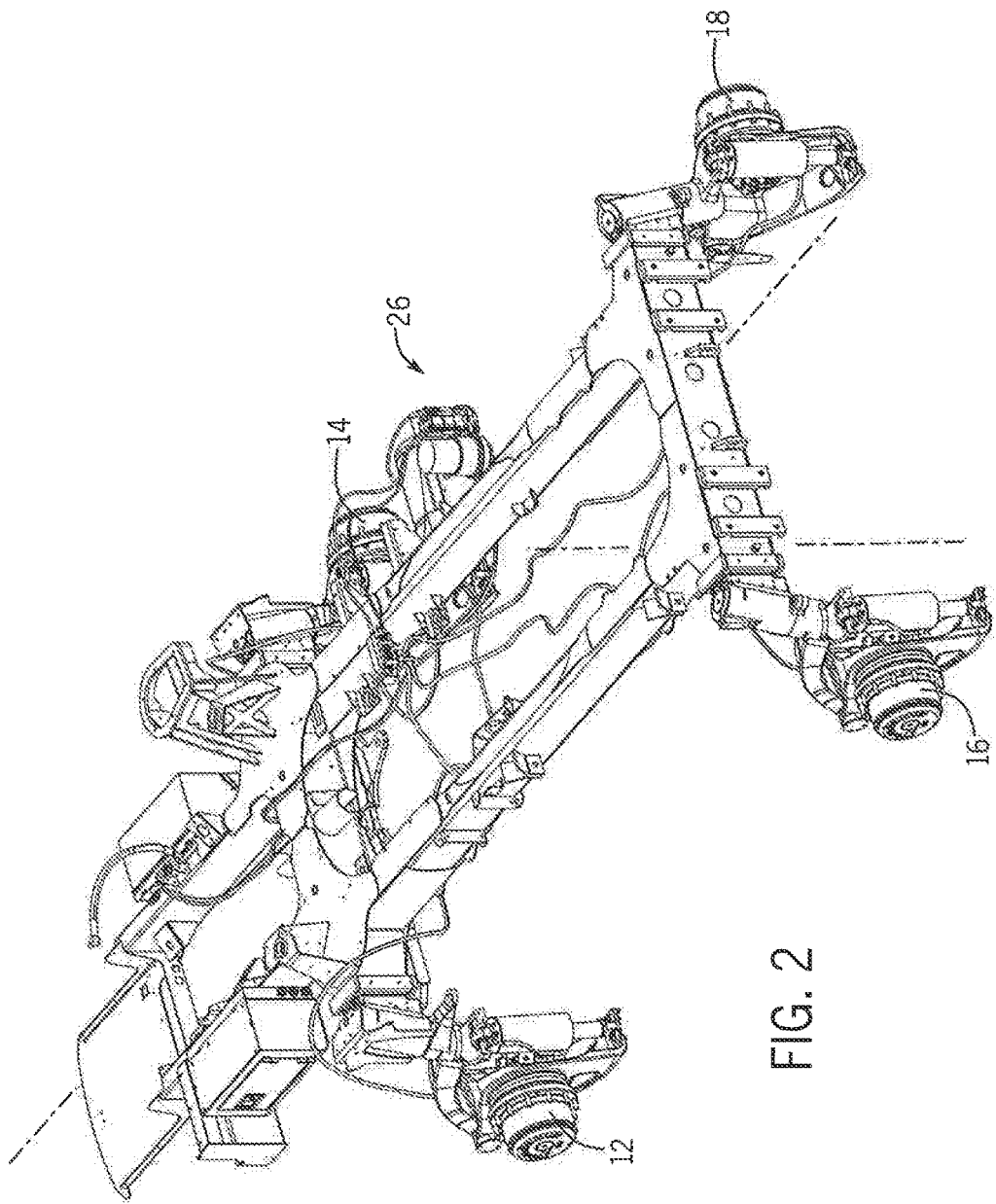
FIG. 2 is an isometric illustration of a portion of a chassis of the applicator of FIG. 1, to better illustrate the propulsion motors.

FIG. 2 shows a portion of a chassis 26 of the applicator 10, to better illustrate the hubs and four hydraulic propulsion motors 12,14,16,18.

Figure 3:
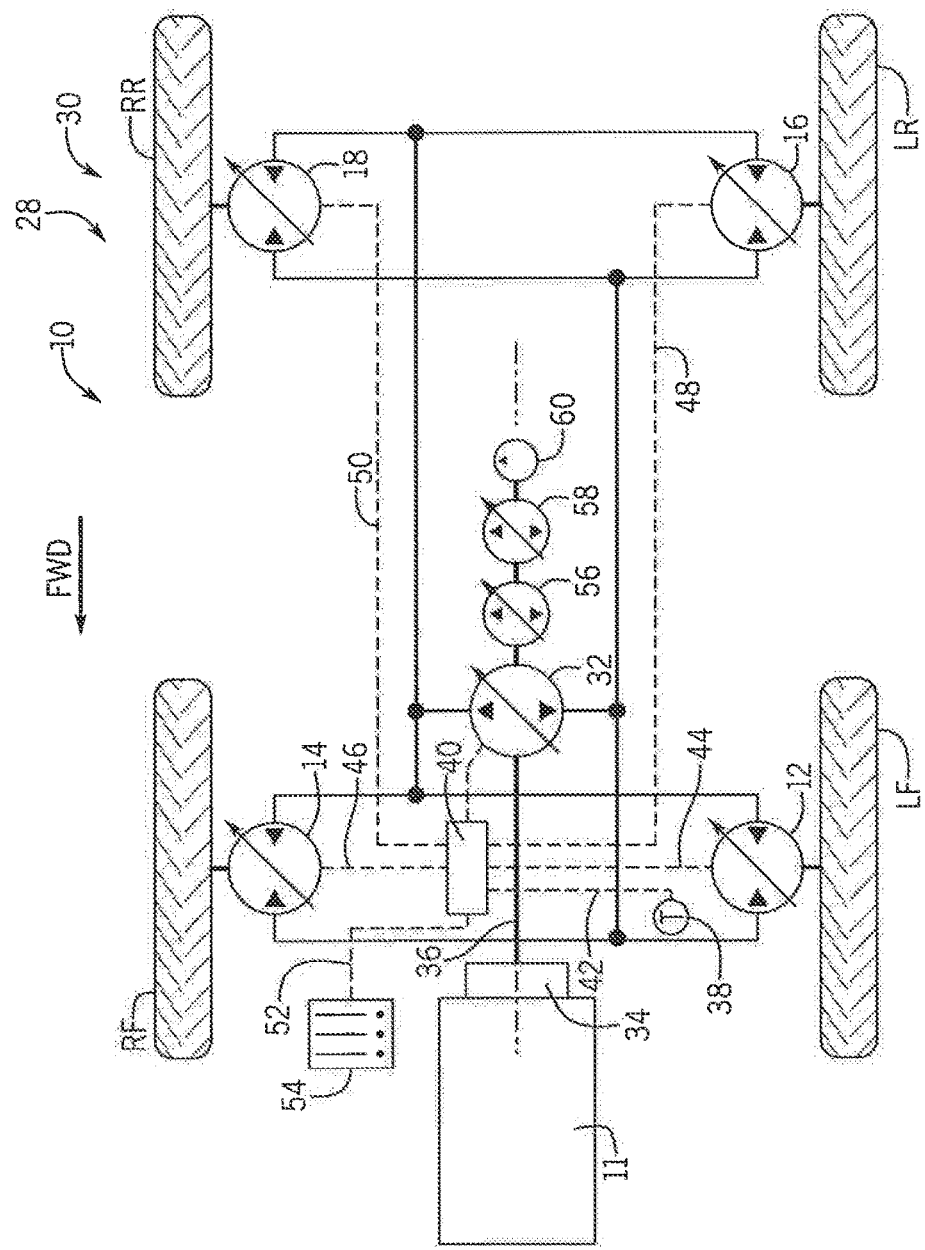
FIG. 3 is a schematic illustration of the exemplary embodiment of the self-propelled applicator of FIG. 1, an exemplary embodiment of a hydrostatic propulsion system of the applicator, and an exemplary embodiment of a system for limiting propulsion speed of the agricultural product applicator of FIG. 1 at high temperatures, according to the invention.

FIG. 3 is a schematic illustration of the exemplary embodiment of the self-propelled applicator 10, driven by an engine 11, and including an exemplary embodiment of a hydrostatic propulsion system 28 of the applicator 10, and an exemplary embodiment of a system 30 for limiting propulsion speed of the agricultural product applicator 10 at high temperatures, according to the invention.

The hydrostatic propulsion system 28 includes a propulsion pump 32 driven by the engine 11 through a clutch arrangement 34 and driveshaft 36, at a fixed ratio of engine speed, and supplying pressurized hydraulic fluid to the four variable-displacement hydraulic propulsion motors 12,14, 16,18 at the wheels LF,RF,LR,RR, for propelling the applicator 10. Each of the variable displacement propulsion motors 12,14,16,18 in the exemplary embodiment includes a variable swashplate that is remotely controllable by an electrical current provided to a proportional solenoid that is an integral part of each of the propulsion motors 12,14,16, 18. The proportional solenoids alter the angle of the swashplates, as a function of the current signals, for controlling motor rotational speed as a function of the swashplate angle of the propulsion motors 12,14,16,18, in a manner known for such motors.

The system 30 for limiting operating speed of the agricultural product applicator 10 at high temperatures, includes a temperature sensor 38 operatively connected the hydraulic system at one of the propulsion motors 12, for detecting a temperature of the pressurized hydraulic fluid in the hydraulic system, and a propel controller 40. The propel controller 40 is operatively connected via an electrical control signal line 42,44,46,48,50 between the temperature sensor 42 and the propulsion motors 12,14,16,18, and, as described in greater detail below, is configured for limiting displacement of the propulsion motors 12,14,16,18 according to a schedule of predetermined de-rated conditions, resulting in reduced speed of the motors 12,14,16,18, when various predetermined motor de-rating activation temperature limits of the hydraulic fluid are detected by the temperature sensor 38.

The propel controller 40 is configured for limiting the maximum operating speed of the propulsion motors 12,14, 16,18 by sending signals over the control lines 42,44,46,48 to limit swashplate angles in a de-rated condition to a minimum swashplate angle is greater than the angle that would result in maximum speed of the motors 12,14,16,18, at normal operating temperatures of the applicator 10. The propulsion motors 12,14,16,18 of the applicator 10 are configured to operate at maximum speed when the swashplate angle, and the corresponding motor displacement resulting from the swashplate angle, are at minimum values. The propel controller 40 is configured and operatively connected to control the swashplate angle at an angle greater than the minimum value of swashplate angle in the de-rated rated condition, to thereby limit operation of the propulsion motors 12,14,16,18 to a speed less than the maximum speed of the motors 12,14,16,18, whenever the propel controller 40 is limiting the motors 12,14,16,18 to operation in a de-rated condition.

The propel controller 40, in the exemplary embodiments of the applicator 10, propulsion system 28 and speed control system 30 is also configured for providing a warning signal, via signal line 52 to a display panel 54 located in the cab of the applicator 10, prior to limiting displacement of the propulsion motors 12,14,16,18, when a predetermined warning activation temperature limit of the hydraulic fluid is detected by the temperature sensor 38.

In the exemplary embodiment, the propel controller 40 is configured to provide, maintain, and remove warnings and de-rated operating conditions according to the derating schedule laid out in the following table, for an exemplary embodiment of an applicator 10 having a normal, non-temperature-limited, maximum operating speed of 40 miles per hour:

| LEVEL | SPEED-LIMITING DE-RATING CONDITION | ACTIVATION TEMPERATURE | DEACTIVATE TEMPERATURE |
|---|---|---|---|
| 1 | NONE (Warning Message) | 102° C. | 99° C. |
| 2 | 7 deg. min angle (~37 mph) | 105° C. | 101° C. |
| 3 | 9 deg. min angle (~32 mph) | 109° C. | 105° C. |

In accordance with the foregoing description and the de-rating schedule in the table above, the propel controller 40 will provide and maintain a warning signal to display panel 54, and will reduce and maintain a de-rated condition of displacement in the propulsion motors 12,14,16,18 as follows: (a) at 102° C. the controller sends a warning to the display panel, and maintains the warning until the temperature sensor 38 detects that the hydraulic fluid has cooled to a warning de-activation temperature of 99° C.; (b) the controller limits motor displacement to a first de-rated condition in a manner providing a first reduction in operating speed of the applicator 10 to 37 mph, at a first motor de-rating activation temperature of 105° C., that is higher than the warning activation temperature of 102° C., and maintains the motor displacement in the first de-rated condition of 7 degrees minimum swashplate angle, until the temperature sensor 38 detects that the hydraulic fluid has cooled to a first motor de-rating de-activation temperature of 101° C. that is lower than the first motor de-rating activation temperature of 105° C.; and, (c) the controller 40 limits motor displacement to a second de-rated condition of 9 degrees minimum swashplate angle in a manner providing a second reduction in operating speed of the applicator 10 to 32 mph at a second motor de-rating activation temperature 109° C. that is higher than the first motor de-rating activation temperature 105° C., and maintains the motor displacement in the second de-rated condition of 9 degrees minimum swashplate angle, until the temperature sensor 38 detects that the hydraulic fluid has cooled to a second motor de-rating de-activation temperature of 105° C. that is lower than the second motor de-rating activation temperature of 109° C.

As illustrated schematically in FIG. 3, the exemplary embodiment of the applicator 10 includes several additional hydraulic pumps 56,58,60, directly driven by the engine 11 which may be a combination of fixed and/or variable displacement pump types, for powering the sprayer 20, or other agricultural product dispensing equipment mounted on the applicator 10. These additional pumps may also service other subsystems of the applicator 10, such as power steering.

The additional pumps 56,58,60 are operatively connected in a series drive arrangement to be driven from an output shaft of the propulsion pump 32 at a fixed ratio of propulsion pump speed, for supplying a fixed, or independently controlled flow of pressurized hydraulic fluid to a non-propulsion hydraulic system, such as the sprayer 20 of the applicator 10, both when the propel controller 40 is operating the propulsion motors 12,14,16,18 in a non-de-rated condition, and when the propel controller 40 is operating the propulsion motors 12,14,16,18 in one of the de-rated conditions. This aspect of the invention provides significant advantage in that the engine 11 and non-propulsion hydraulic systems served by the additional pumps 56,58,60 may continue to operate at maximum speed and power during periods of high ambient temperature when the propel controller 40 is causing the propulsion motors 12,14,16,18 to operate in a de-rated, speed-limited condition.

An additional advantage is provided, by limiting displacement of the propulsion motors 12,14,16,18 in accordance with the invention, rather than slowing engine speed, in that the propulsion pump 32 continues to circulate the hydraulic fluid in the propulsion system 28 through cooling heat exchangers (not shown) of the propulsion system 28 at a maximum flow rate, to thereby facilitate a higher cooling rate of the hydraulic fluid in the propulsion system 28 when the propel controller 40 is operating the propulsion motors 12,14,16,18 at a reduced speed.

Those having skill in the art will appreciate that the invention provides an elegantly straightforward approach to allowing near full-rated operation of an applicator under extreme temperature conditions, by recognizing and advantageously utilizing an inherent characteristic of swashplate-type hydraulic motors. Specifically, the inventors took advantage of the tendency of such motors to lose efficiency during maximum speed operation at minimum displacement, that is at minimum swashplate angles. Motor inefficiency increases heating of the fluid. The inventors recognized that by derating the motors in the manner taught by the invention, motor inefficiency and fluid heating are advantageously reduced in a manner providing significant reductions in heating and temperature of the hydraulic fluid, with only minimal reductions in full-rated operation of the applicator.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for limiting operating speed at high temperatures in a hydraulically-driven, self-propelled, agricultural product applicator having a hydraulic system including a pump supplying pressurized hydraulic fluid to a variable-displacement hydraulic motor operatively connected for propelling the applicator, the system comprising:
   a temperature sensor operatively connected for detecting a temperature of the pressurized hydraulic fluid in the hydraulic system; and
   a propel controller operatively connected to the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor.

2. The speed limiting system of claim 1, wherein the controller is further configured to provide a warning signal prior to limiting displacement of the propulsion motor, when a predetermined warning activation temperature limit of the hydraulic fluid is detected by the temperature sensor, with the warning activation temperature being lower than the motor de-rating activation temperature.

3. A system for limiting operating speed at high temperatures in a hydraulically-driven, self-propelled, agricultural product applicator having a hydraulic system including a pump supplying pressurized hydraulic fluid to a variable-displacement hydraulic motor operatively connected for propelling the applicator, the system comprising:
   a temperature sensor operatively connected for detecting a temperature of the pressurized hydraulic fluid in the hydraulic system; and
   a propel controller operatively connected between the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor;

wherein the propulsion motor includes a swashplate for controlling motor rotational speed as a function of swashplate angle, and the propel controller is operatively connected for limiting motor speed by limiting swashplate angle in the de-rated condition.

4. The speed limiting system of claim 3, wherein the propulsion motor operates at maximum speed when the swashplate angle and corresponding motor displacement are at minimum values, and the controller is operatively connected to control the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition.

5. A system for limiting operating speed at high temperatures in a hydraulically-driven, self-propelled, agricultural product applicator having a hydraulic system including a pump supplying pressurized hydraulic fluid to a variable-displacement hydraulic motor operatively connected for propelling the applicator, the system comprising:
  a temperature sensor operatively connected for detecting a temperature of the pressurized hydraulic fluid in the hydraulic system; and
  a propel controller operatively connected between the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor;
  wherein the propel controller is further configured for maintaining the propulsion motor in the de-rated condition until the temperature sensor detects that the hydraulic fluid temperature has dropped to a predetermined motor de-rating de-activation temperature.

6. The speed limiting system of claim 5, wherein the controller is further configured for de-rating the propulsion motor according to a derating schedule having at least a first and a second de-rated condition with corresponding first and second reductions in displacement of the propulsion motor in response to a schedule of respective first and second motor de-rating activation and de-activation temperatures.

7. The speed limiting system of claim 6, wherein the controller is further configured to maintain the warning signal prior until a predetermined warning de-activation temperature limit of the hydraulic fluid is detected by the temperature sensor, with the warning de-activation temperature being lower than the warning activation temperature.

8. The speed limiting system of claim 5, wherein the controller is further configured to provide a warning signal prior to reducing displacement of the propulsion motor, when a predetermined warning activation temperature limit of the hydraulic fluid is detected by the temperature sensor, with the warning activation temperature being lower than the motor de-rating activation temperature.

9. The speed limiting system of claim 8, wherein the controller is configured for providing and maintaining the warning signal, and for reducing and maintaining propulsion motor displacement in accordance with a schedule of predetermined temperatures as determined by the temperature sensor, in which:
  the controller sends the warning at a warning activation temperature, and maintains the warning until the temperature sensor detects that the hydraulic fluid has cooled to a warning de-activation temperature that is lower than the warning activation temperature;
  the controller limits motor displacement to a first de-rated condition in a manner providing a first reduction in operating speed of the applicator at a first motor de-rating activation temperature that is higher than the warning activation temperature, and maintains the limited motor displacement in the first de-rated condition until the temperature sensor detects that the hydraulic fluid has cooled to a first motor de-rating de-activation temperature that is lower than the first motor de-rating activation temperature; and
  the controller limits motor displacement to a second de-rated condition in a manner providing a second reduction in operating speed of the applicator at a second motor de-rating activation temperature that is higher than the first motor de-rating activation temperature, and maintains the limited motor displacement in the second de-rated condition until the temperature sensor detects that the hydraulic fluid has cooled to a second motor de-rating de-activation temperature that is lower than the second motor de-rating activation temperature.

10. A self-propelled, hydraulically-driven, agricultural product applicator having an engine and a hydrostatic drive system, the hydrostatic drive system including a propulsion pump driven by the engine at a fixed ratio of engine speed and supplying pressurized hydraulic fluid to a variable-displacement hydraulic propulsion motor operatively connected for propelling the applicator, and a system for limiting operating speed of the hydraulically-driven, self-propelled, agricultural product applicator at high temperatures, where the system for limiting speed at high temperatures comprises:
  a temperature sensor operatively connected for detecting a temperature of the pressurized hydraulic fluid in the hydraulic system; and
  a propel controller operatively connected to the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor.

11. The agricultural product applicator of claim 10, wherein the controller is further configured to provide a warning signal prior to limiting displacement of the propulsion motor, when a predetermined warning activation temperature limit of the hydraulic fluid is detected by the temperature sensor, with the warning activation temperature being lower than the motor de-rating activation temperature.

12. A self-propelled, hydraulically-driven, agricultural product applicator having an engine and a hydrostatic drive system, the hydrostatic drive system including a propulsion pump driven by the engine at a fixed ratio of engine speed and supplying pressurized hydraulic fluid to a variable-displacement hydraulic propulsion motor operatively connected for propelling the applicator, and a system for limiting operating speed of the hydraulically-driven, self-propelled, agricultural product applicator at high temperatures, where the system for limiting speed at high temperatures comprises:
  a temperature sensor operatively connected for detecting a temperature of the pressurized hydraulic fluid in the hydraulic system; and
  a propel controller operatively connected between the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor;

wherein the propel controller is further configured for maintaining the propulsion motor in the de-rated condition until the temperature sensor detects that the hydraulic fluid temperature has dropped to a predetermined motor de-rating de-activation temperature.

13. A self-propelled, hydraulically driven, agricultural product applicator having an engine and a hydrostatic drive system, the hydrostatic drive system including a propulsion pump driven by the engine at a fixed ratio of engine speed and supplying pressurized hydraulic fluid to a variable-displacement hydraulic propulsion motor operatively connected for propelling the applicator, and a system for limiting operating speed of the hydraulically-driven, self-propelled, agricultural product applicator at high temperatures, where the system for limiting speed at high temperatures comprises:

a temperature sensor operatively connected for detecting a temperature of the pressurized hydraulic fluid in the hydraulic system; and a propel controller operatively connected between the temperature sensor and the propulsion motor and configured for limiting displacement of the propulsion motor according to a predetermined de-rated condition resulting in reduced motor speed, when a predetermined motor de-rating activation temperature limit of the hydraulic fluid is detected by the temperature sensor;

wherein the propulsion motor includes a swashplate for controlling motor rotational speed as a function of swashplate angle, and the propel controller is operatively connected for limiting motor speed by limiting swashplate angle in the de-rated condition.

14. The agricultural product applicator of claim 13, wherein the propulsion motor operates at maximum speed when the swashplate angle and corresponding motor displacement are at minimum values, and the controller is operatively connected to control the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition.

15. The agricultural product applicator of claim 14, wherein the applicator includes at least one additional pump operatively connected to be driven from the propulsion pump at a fixed ratio of propulsion pump speed, for supplying a fixed flow of pressurized hydraulic fluid to a non-propulsion hydraulic system of the applicator when the propel controller is operating the propulsion motor in a de-rated condition, and when the propel controller is operating the propulsion motor in a de-rated condition.

16. The agricultural product applicator of claim 15, wherein the controller is further configured for de-rating the propulsion motor according to a derating schedule having at least a first and a second de-rated condition with corresponding first and second reductions in displacement of the propulsion motor in response to a schedule of respective first and second motor de-rating activation and de-activation temperatures.

17. The agricultural product applicator of claim 16, wherein the controller is configured for providing a warning signal prior to limiting displacement of the propulsion motor, when a predetermined warning activation temperature limit of the hydraulic fluid is detected by the temperature sensor, and for reducing and maintaining propulsion motor displacement in accordance with a schedule of predetermined temperatures as determined by the temperature sensor, in which:

the controller sends the warning at a warning activation temperature, and maintains the warning until the temperature sensor detects that the hydraulic fluid has cooled to a warning de-activation temperature that is lower than the warning activation temperature;

the controller limits motor displacement to a first de-rated condition in a manner providing a first reduction in operating speed of the applicator at a first motor de-rating activation temperature that is higher than the warning activation temperature, and maintains the limited motor displacement in the first de-rated condition until the temperature sensor detects that the hydraulic fluid has cooled to a first motor de-rating de-activation temperature that is lower than the first motor de-rating activation temperature; and the controller limits motor displacement to a second de-rated condition in a manner providing a second reduction in operating speed of the applicator at a second motor de-rating activation temperature that is higher than the first motor de-rating activation temperature, and maintains the limited motor displacement in the second de-rated condition until the temperature sensor detects that the hydraulic fluid has cooled to a second motor de-rating de-activation temperature that is lower than the second motor de-rating activation temperature.

18. A method for limiting operating speed at high temperatures in a hydraulically-driven, self-propelled, agricultural product applicator having a hydraulic system including a propulsion pump supplying pressurized hydraulic fluid to a variable-displacement hydraulic propulsion motor operatively connected for propelling the applicator, the method comprising:

operatively connecting a temperature sensor for detecting a temperature of the pressurized hydraulic fluid in the hydraulic system;

operatively connecting a propel controller to the temperature sensor and the propulsion motor and configuring the controller for limiting displacement of the propulsion motor according to a predetermined de-rated condition resulting in reduced motor speed, when a predetermined motor de-rating activation temperature limit of the hydraulic fluid is detected by the temperature sensor; and limiting displacement of the propulsion motor according to the predetermined de-rated condition resulting in reduced propulsion motor speed, when a predetermined motor de-rating activation temperature limit of the hydraulic fluid is detected by the temperature sensor.

19. A method for limiting operating speed at high temperatures in a hydraulically-driven, self-propelled, agricultural product applicator having a hydraulic system including a propulsion pump supplying pressurized hydraulic fluid to a variable-displacement hydraulic propulsion motor operatively connected for propelling the applicator, the method comprising:

operatively connecting a temperature sensor for detecting a temperature of the pressurized hydraulic fluid in the hydraulic system;

operatively connecting a propel controller between the temperature sensor and the propulsion motor and configuring the controller for limiting displacement of the propulsion motor according to a predetermined de-rated condition resulting in reduced motor speed, when a predetermined motor de-rating activation temperature limit of the hydraulic fluid is detected by the temperature sensor; and limiting displacement of the propulsion motor according to the predetermined de-rated condition resulting in reduced propulsion motor speed, when a predetermined motor de-rating activation temperature limit of the hydraulic fluid is detected by the temperature sensor;

wherein:
- the propulsion motor includes a swashplate for controlling motor rotational speed as a function of swashplate angle, and the propel controller is operatively connected for limiting propulsion motor speed by limiting swashplate angle in the de-rated condition;
- the propulsion motor operates at maximum speed when the swashplate angle and corresponding motor displacement are at minimum values, and the controller is operatively connected to control the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition; and
- the method further includes, controlling the swashplate angle at an angle greater than the minimum value of swashplate angle in the de-rated condition, to thereby limit operation of the propulsion motor to a speed less than the maximum speed of the motor whenever the controller is limiting the motor to operation in the de-rated condition.

20. A method for limiting operating speed at high temperatures in a hydraulically driven self-propelled, agricultural product applicator having a hydraulic system including a propulsion pump supplying pressurized hydraulic fluid to a variable-displacement hydraulic propulsion motor operatively connected for propelling the applicator, the method comprising:

operatively connecting a temperature sensor for detecting a temperature of the pressurized hydraulic fluid in the hydraulic system;

operatively connecting a propel controller between the temperature sensor and the propulsion motor and configuring the controller for limiting displacement of the propulsion motor according to a predetermined de-rated condition resulting in reduced motor speed, when a predetermined motor de-rating activation temperature limit of the hydraulic fluid is detected by the temperature sensor; and limiting displacement of the propulsion motor according to the predetermined de-rated condition resulting in reduced propulsion motor speed, when a predetermined motor de-rating activation temperature limit of the hydraulic fluid is detected by the temperature sensor;

wherein the controller is configured for providing and maintaining a warning signal, and for reducing and maintaining propulsion motor displacement in accordance with a schedule of predetermined temperatures as determined by the temperature sensor, the method further comprises performing at least one operation from the list of operations consisting of:
- sending the warning signal at a warning activation temperature, and maintaining the warning until the temperature sensor detects that the hydraulic fluid has cooled to a warning de-activation temperature that is lower than the warning activation temperature;
- limiting motor displacement to a first de-rated condition in a manner providing a first reduction in operating speed of the applicator at a first motor de-rating activation temperature that is higher than the warning activation temperature, and maintaining the limited motor displacement in the first de-rated condition until the temperature sensor detects that the hydraulic fluid has cooled to a first motor de-rating de-activation temperature that is lower than the first motor de-rating activation temperature; and
- limiting motor displacement to a second de-rated condition in a manner providing a second reduction in operating speed of the applicator at a second motor de-rating activation temperature that is higher than the first motor derating activation temperature, and maintaining the limited motor displacement in the second de-rated condition until the temperature sensor detects that the hydraulic fluid has cooled to a second motor derating de-activation temperature that is lower than the second motor de-rating activation temperature.

* * * * *